US009134200B2

(12) United States Patent
Waite et al.

(10) Patent No.: US 9,134,200 B2
(45) Date of Patent: Sep. 15, 2015

(54) MOTOR VEHICLE CHASSIS SENSOR

(71) Applicants: Daryn L. Waite, Arlington Heights, IL (US); Jay Lewis Hinkle, Bartlett, IL (US)

(72) Inventors: Daryn L. Waite, Arlington Heights, IL (US); Jay Lewis Hinkle, Bartlett, IL (US)

(73) Assignee: CTS CORPORATION, Elkhart, IN (US)

( * ) Notice: Subject to any disclaimer, the term of this patent is extended or adjusted under 35 U.S.C. 154(b) by 140 days.

(21) Appl. No.: 13/967,225

(22) Filed: Aug. 14, 2013

(65) Prior Publication Data

US 2014/0047913 A1 Feb. 20, 2014

Related U.S. Application Data

(60) Provisional application No. 61/684,454, filed on Aug. 17, 2012.

(51) Int. Cl.
*G01M 17/06* (2006.01)
*G01M 17/007* (2006.01)
*G01D 5/14* (2006.01)
*G01D 11/24* (2006.01)

(52) U.S. Cl.
CPC ............ *G01M 17/007* (2013.01); *G01D 5/145* (2013.01); *G01D 11/245* (2013.01)

(58) Field of Classification Search
CPC ...................................................... G01M 17/06
USPC .............................. 73/117.01, 117.02, 117.03
See application file for complete search history.

(56) References Cited

U.S. PATENT DOCUMENTS

| | | | |
|---|---|---|---|
| 5,400,654 A | 3/1995 | Kaiser et al. | |
| 5,646,523 A | 7/1997 | Kaiser et al. | |
| 5,880,585 A | 3/1999 | Oguro | |
| 5,922,953 A | 7/1999 | Payne et al. | |
| 6,515,473 B2 | 2/2003 | Pfaffenberger et al. | |
| 6,566,864 B1 | 5/2003 | Brown et al. | |
| 6,597,168 B1 | 7/2003 | Lee | |
| 7,208,943 B2 | 4/2007 | Godoy et al. | |
| 7,230,419 B2 | 6/2007 | Godoy et al. | |
| 7,439,732 B2 | 10/2008 | LaPlaca | |
| 2002/0139179 A1* | 10/2002 | Okumura | 73/118.1 |
| 2003/0080732 A1 | 5/2003 | Okazaki et al. | |
| 2004/0093936 A1* | 5/2004 | Mukaiyama | 73/118.1 |
| 2004/0144184 A1* | 7/2004 | Nakatani et al. | 73/862.331 |
| 2006/0273784 A1* | 12/2006 | Godoy et al. | 324/207.2 |

(Continued)

FOREIGN PATENT DOCUMENTS

| | | |
|---|---|---|
| DE | 102006043291 A1 | 3/2008 |
| DE | 102007034099 A1 | 1/2009 |

(Continued)

*Primary Examiner* — Eric S McCall
(74) *Attorney, Agent, or Firm* — Daniel J. Deneufbourg

(57) ABSTRACT

A vehicle chassis sensor assembly comprising a housing member defining a sensor cartridge slot, a rotatable shaft with a magnet and retained in a sleeve, and a rotatable arm coupled to the shaft. A sensor cartridge is mounted in the slot through the interior of a connector socket and an opening between the slot and the connector socket. A plate on the sensor cartridge covers the opening. The sensor cartridge includes a terminal header and a separate board mounted to the terminal header. The board includes the sensor. Deformable posts on the terminal header and the sensor assembly extend through respective apertures in the board and the terminal header for securing the board and the sensor cartridge to the terminal header and the sensor assembly respectively.

11 Claims, 6 Drawing Sheets

(56) References Cited

U.S. PATENT DOCUMENTS

2011/0004362 A1    1/2011    Wong et al.
2011/0115480 A1    5/2011    Babin

FOREIGN PATENT DOCUMENTS

| EP | 1901040 A3 | 8/2007 |
|----|------------|--------|
| JP | 2004219128 A | 8/2004 |

\* cited by examiner

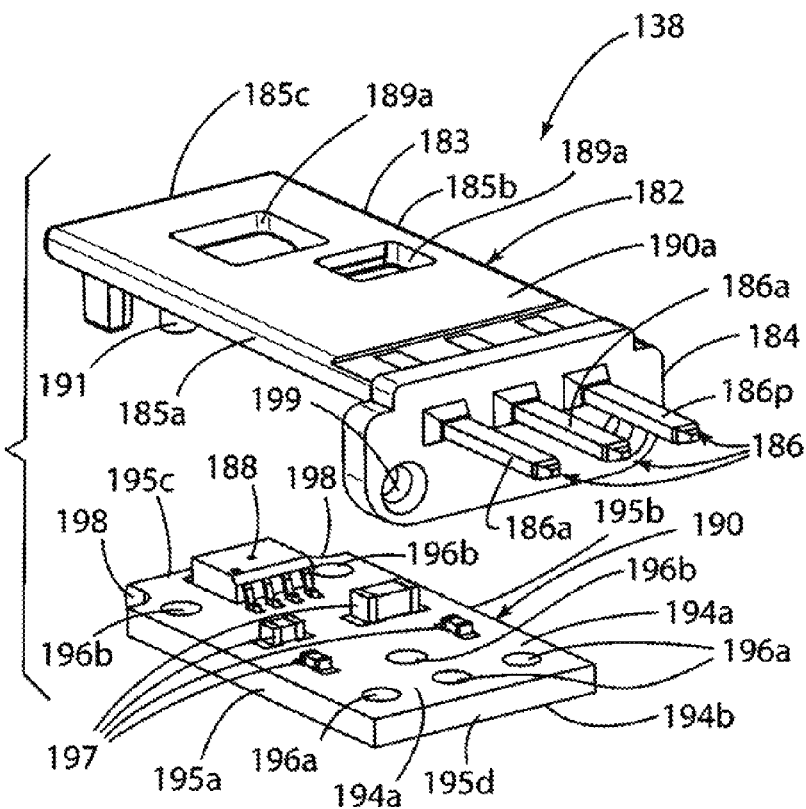
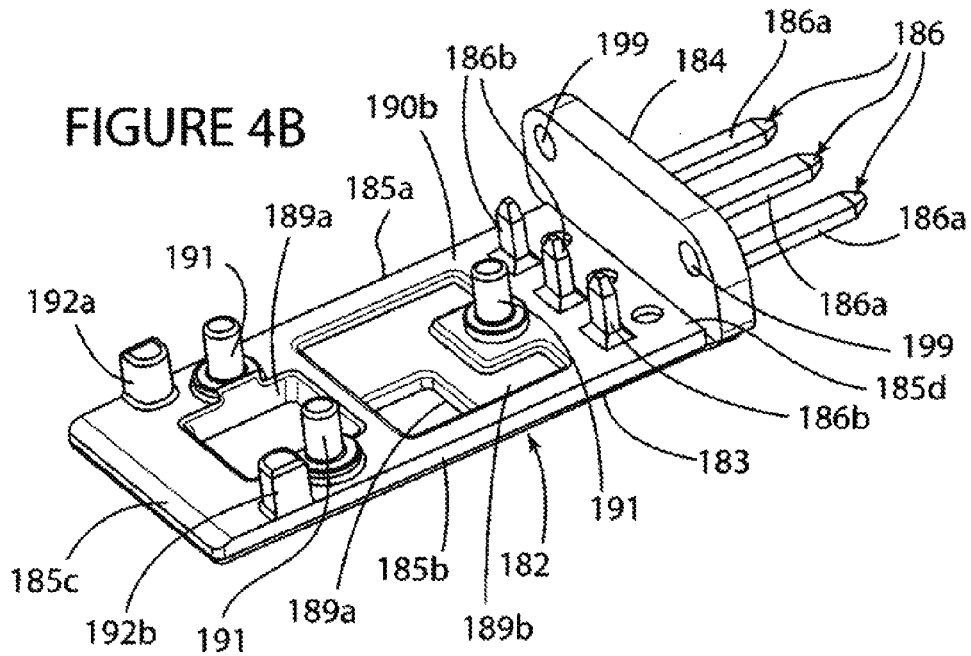

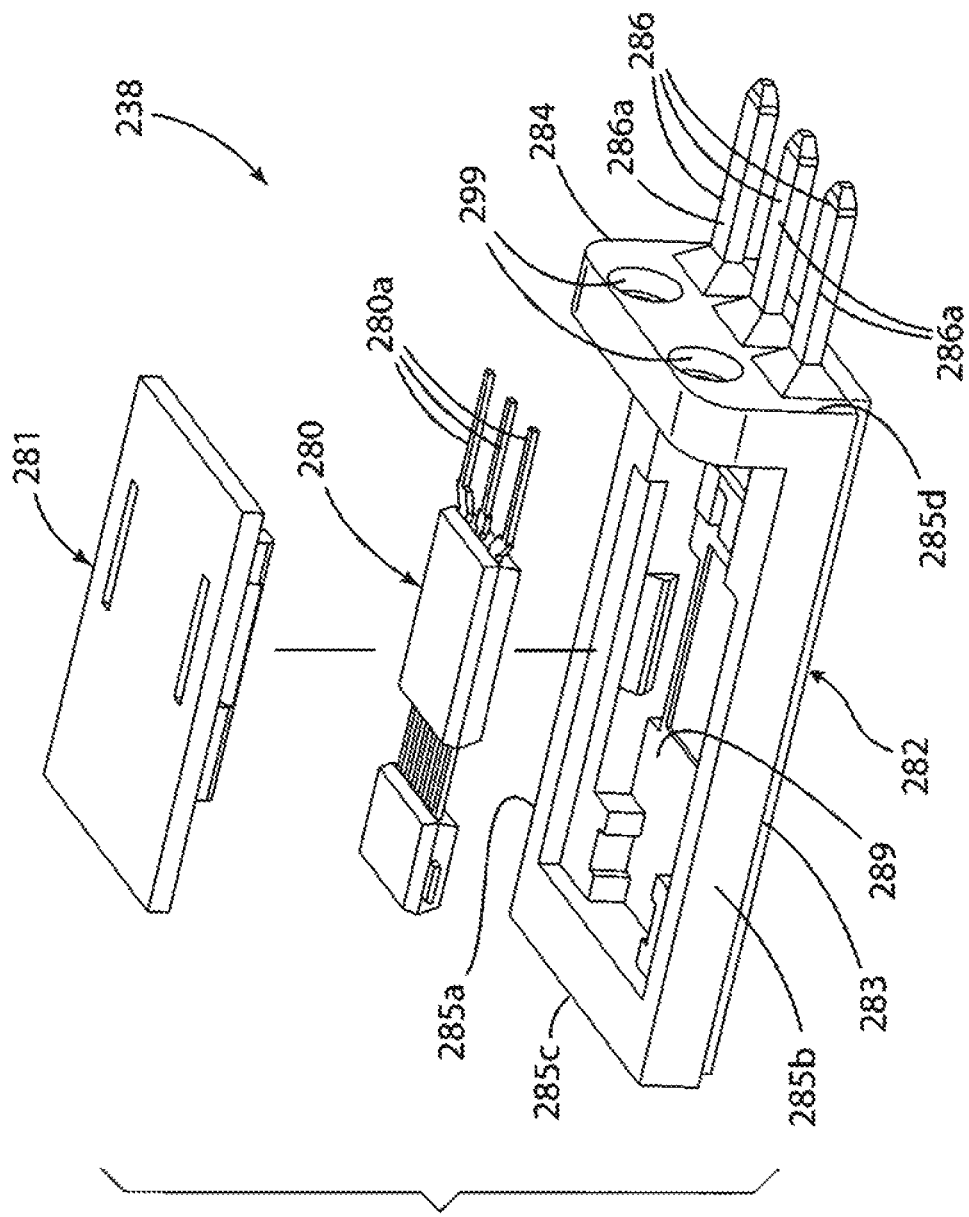

MOTOR VEHICLE CHASSIS SENSOR

CROSS-REFERENCE TO RELATED APPLICATIONS

This application claims the benefit of the filing date and disclosure of U.S. Provisional Application Ser. No. 61/684,454 filed on Aug. 17, 2012 which is explicitly incorporated herein by reference as are all references cited therein.

FIELD OF THE INVENTION

This invention relates to a sensor for motor vehicle applications and particularly to a sensor assembly adapted for sensing the ride height of a vehicle.

BACKGROUND OF THE INVENTION

Modern motor vehicles employ numerous types of sensors and sensor assemblies throughout the vehicle which are used in control systems for powertrain, chassis, interior cabin environment, and safety, among many other applications. One type of sensor is used for detecting the ride height position of the vehicle. This is a measure of the position of sprung chassis or body components relative to unsprung chassis components such as axles, steering knuckles, and axle hubs (also referred to as jounce motion).

Such sensors are used in a variety of applications. For example, some vehicles have headlights systems which adapt to various loading conditions to maintain their desired aiming point over a variety of vehicle loads. In such applications, a ride height sensor indicating the position of a front and rear wheel component is processed to set the aiming point. Another application is for actively controlled suspension components such as shock absorbers and springs which are dynamically adjusted based on wheel motion inputs. Adjustments of spring preloading for rear axles is also accomplished using data from a ride height sensor used to inflate air bladders or other suspension components to adapt to different loading conditions.

Many designs of ride height sensors are presently known. The devices currently available operate generally satisfactorily. However, there are certain failure modes and performance requirements challenges with current designs. Since these devices are located in the undercarriage area of a motor vehicle, they are exposed to a very hostile environment of moisture, salt, dirt, physical damage, and extreme temperature changes.

One goal is to reduce the leakage paths present in the sensor assembly which can allow moisture to enter sensitive electronic elements of the sensor. Many current designs of such sensors have at least two leakage paths. One of these paths is related to a cover or potting material placed over installed electronic components. This leakage path is prone to failure and sealing it imposes cost penalties. Irrespective of the design of the sensor assembly, there is a continuing desire by automotive manufacturers to reduce the mass and cost of all automotive components, including chassis sensors.

Another goal is to reduce the complexity of and improve the components of the sensor assembly including, for example, the sensor cartridge.

SUMMARY OF THE INVENTION

The present invention is directed to a sensor assembly for measuring rotary motion that comprises a first housing forming a blind cartridge slot terminating at an opening located between the blind cartridge slot and an electrical connector socket unitary with the first housing, the first housing further including a wall having mounting provisions for affixing the sensor assembly to supporting structure; a second housing affixed to the first housing; a shaft positioned to rotate relative to the first and second housings and being axially trapped in position between the first and second housings, the shaft retaining a permanent magnet; an arm coupled to and rotatable with the shaft; and a sensor cartridge assembly having a magnetic sensitive element carried by a terminal header inserted into the blind cartridge slot in the first housing through the connector socket and through the opening between the connector socket and the blind cartridge slot, the terminal header including a wall that covers the opening between the blind cartridge slot and the connector socket.

In one embodiment, the arm is adapted for connection to the chassis of a vehicle for measuring the ride height of a vehicle.

In one embodiment, the magnetic sensitive element is a Hall effect element or a magneto resistive element.

In one embodiment, the first housing includes at least a first post that extends through at least a first aperture defined in the sensor cartridge assembly and is staked to the sensor cartridge assembly for securing the sensor cartridge assembly in the blind cartridge slot in the first housing.

In one embodiment, the sensor cartridge assembly includes a terminal header having a first plate with at least a first post and a board having the magnetic sensitive element and defining at least a first aperture, the first post on the terminal header extending through the first aperture in the board for securing the board to the first plate of the terminal header.

In one embodiment, the sensor cartridge assembly includes a terminal header with a plate defining a cradle for the magnetic sensitive element, and a cover overlying the plate and the magnetic sensitive element.

The present invention is also directed to a vehicle chassis sensor assembly comprising a first housing member defining a sensor cartridge slot; a connector housing coupled to the first housing member and defining a connector socket, the sensor cartridge slot and the connector socket being in communication via an opening between the sensor cartridge slot and the connector socket; a shaft rotatable relative to the first housing member and including a magnet for generating a magnetic field; a sleeve that guides the rotary movement of the shaft and prevents the axial movement of the shaft; a rotatable arm member, the shaft being coupled to the arm member and rotatable in response to the rotation of the arm member; and a sensor cartridge including a sensor and mounted in the first housing member through the connector socket and the opening between the sensor cartridge slot and the connector socket, the sensor being adapted to sense a change in the magnetic field generated by the magnet in response to the rotation of the shaft.

In one embodiment, the sensor cartridge includes a plate that covers the opening between the sensor cartridge slot and the connector socket.

In one embodiment, the sensor cartridge includes a terminal header and a board coupled to the terminal header, the sensor being mounted on the board.

In one embodiment, the terminal header includes a plurality of posts extending through respective apertures defined in the board for securing the board to the terminal header.

In one embodiment, the first housing member includes at least a first post extending through at least a first aperture defined in the sensor cartridge for securing the sensor cartridge in the first housing member.

The present invention is further directed to a sensor cartridge for a sensor assembly comprising a terminal header including a first plate with terminals; and a board including a sensor, the board being mounted to the first plate of the terminal header and defining apertures that receive the terminals in the terminal header.

In one embodiment, the terminal header includes a second plate that covers an opening in the sensor assembly, the terminals extending through the second plate.

In one embodiment, the first plate includes at least a first post adapted to extend through at least a first aperture in the board for securing the board to the terminal header.

In one embodiment, the sensor assembly includes at least a first post adapted to extend through at least a first aperture in the terminal header for securing the sensor cartridge to the sensor assembly.

Additional benefits and advantages of the present invention will become apparent to those skilled in the art to which the present invention relates from the subsequent description of the preferred embodiment and the appended claims, taken in conjunction with the accompanying drawings.

BRIEF DESCRIPTION OF THE DRAWINGS

FIG. 4A is an exploded perspective view of one embodiment of a sensor cartridge of the vehicle chassis sensor assembly of the present invention;

FIG. 4B is a perspective view of the terminal header of the sensor cartridge shown in FIG. 4A;

FIG. 4C is an exploded perspective view of another embodiment of a sensor cartridge of the vehicle chassis sensor assembly of the present invention;

DETAILED DESCRIPTION OF THE INVENTION

Figure 1:
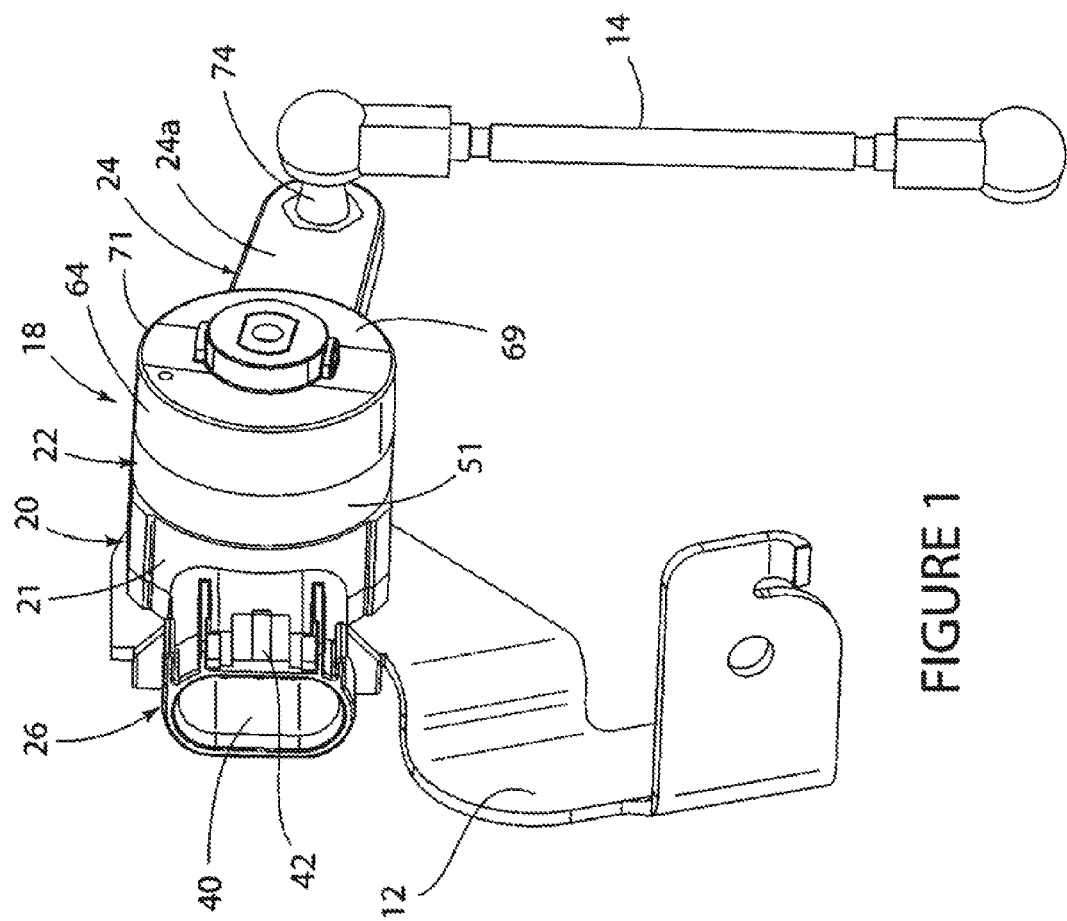
FIG. 1 is a perspective view of a motor vehicle chassis sensor assembly in accordance with the present invention for measuring ride height position with vehicle chassis mounting and linkage components coupled thereto.

FIG. 1 depicts a rotary position sensor assembly of the type in accordance with the present invention which, in the embodiment shown, is in the form of a motor vehicle chassis sensor assembly 18 for measuring and determining the ride height position of a vehicle.

As shown in FIG. 1, sensor assembly 18 is fixed to a metal chassis bracket 12 which is coupled to a motor vehicle frame or body component (not shown) which is sprung by the vehicle suspension system (not shown). Linkage 14 couples a rotary arm member 24 of the sensor assembly 18 to an unsprung component of the vehicle's chassis such as, for example, a rear axle, a steering knuckle, a hub component, or such other component which moves with the road engaging wheels and tires (which are unsprung chassis components). Relative motion (jounce) between the sprung and unsprung components of the vehicle chassis cause the rotary motion of the rotary arm member 24. This rotary motion is sensed by a sensor element and is converted into electrical signals used for various control functions, some of which are generally described previously.

Figure 2:
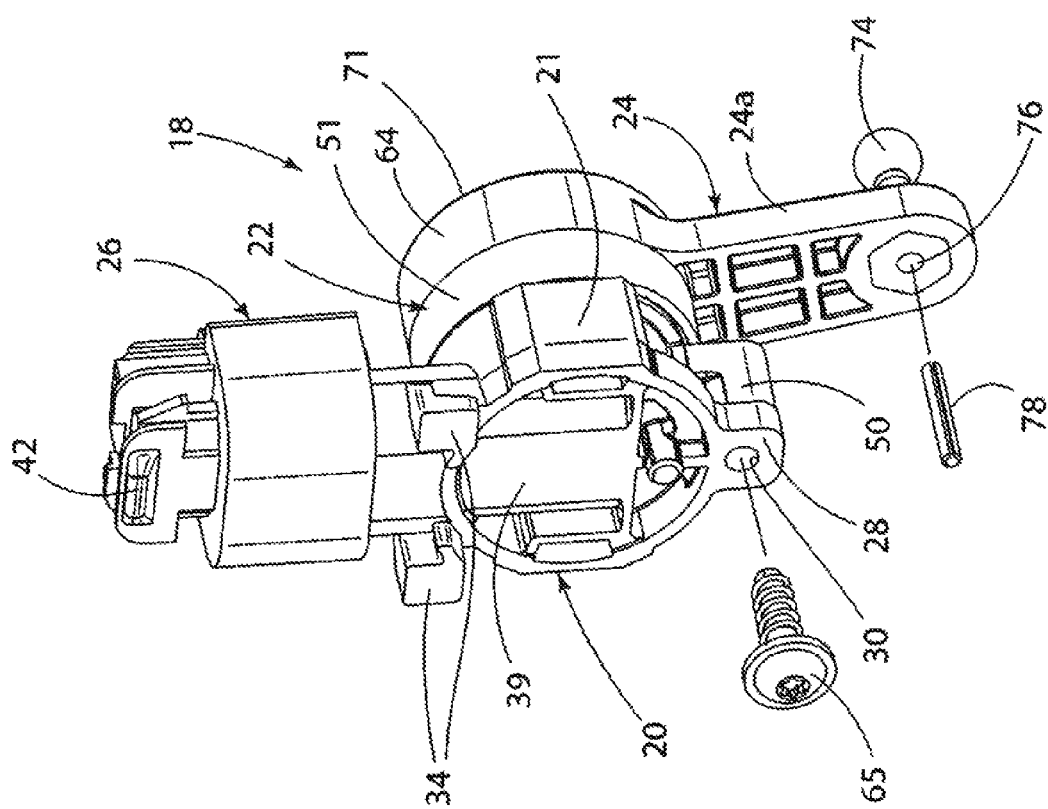
FIG. 2 is a partially exploded perspective view of the vehicle chassis sensor assembly in accordance with the present invention.
Figure 3:
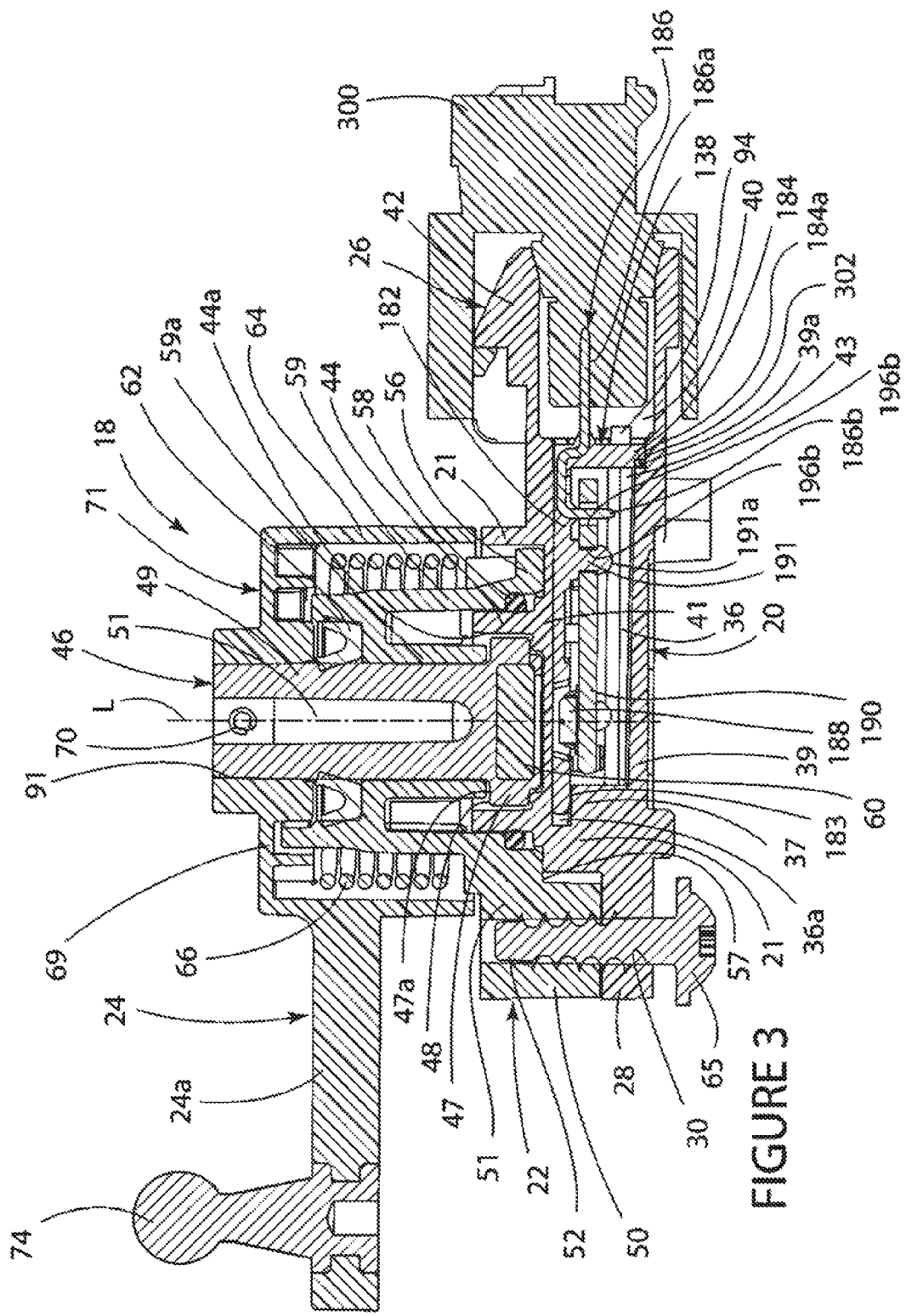
FIG. 3 is a vertical cross-sectional view of the vehicle chassis sensor assembly shown in FIG. 2 with an electrical connector coupled thereto.

Sensor assembly 18 in accordance with the present invention is illustrated in FIG. 2 which shows the primary components, members, and elements of the sensor assembly 18 including the following members or components which can all be made of a suitable plastic material: a stationary lower housing or first housing member 20 that houses a sensor cartridge assembly 138 in the interior of a cartridge slot 36, an upper housing or second housing member or sleeve 22 that guides and retains a rotatable shaft 46, a rotary arm or rotatable arm member 24 that is coupled to the shaft 46 that rotates the shaft 46 in response to the rotation of the arm member 24, and an electrical terminal connector housing 26 that is unitary with the first housing member 20 and is adapted to receive an electrical connector 300 (FIG. 3).

Housing member 20 which, in the embodiment shown, is generally in the form of a ring or cylinder, includes an outer wall 21 that incorporates exterior mounting and location features including an exterior fastener boss or bracket 28 defining an interior threaded fastener aperture 30, and a pair of exterior locating bosses or ears 34 that are located in a diametrically opposed relationship to the bracket 28. Fastener bracket 28 along with locating bosses 34 are received by respective mating surfaces and apertures (not shown) formed by the chassis bracket 12 (FIG. 1) to provide a secure and accurate mounting and location of the sensor assembly 18 to the chassis bracket 12.

FIG. 3 provides additional details of each of the individual components or members or elements of the sensor assembly 18.

As shown, the housing member 20 forms and defines an interior sensor cartridge slot or cavity 36 that receives and houses a sensor cartridge assembly 138 as described in more detail below. The cartridge slot 36 is defined and bounded by the combination of the interior surface of a base horizontal wall 39 of the housing member 20; the interior surface of a top horizontal wall 41 of the housing member 20 that is located opposite, spaced from, and parallel to the base wall 39; and the interior surface of the vertical wall 21 of the housing member 20 extending between and unitary with the ends of, and in a relationship generally normal to, the base wall 39 and the top wall 41.

The cartridge slot 36 is in communication with the interior of the connector socket 40 of the connector housing 26 via an opening 43 defined by the housing member 20 and located between the cartridge slot 36 and the interior of the connector socket 40. In the embodiment shown, the connector housing 26 is unitary with, and protrudes outwardly from, the exterior surface of the wall 21 of the housing member 20. Electrical connector socket 40 is adapted to receive an electrical connector 300 which includes elements of known configuration. Open connector socket 40 also is provided with connector locking features including a tang 42 for providing positive locking of the electrical connector 300 at its installed position to the connector housing 26 and inside the connector socket 40.

It is important regarding the elimination of leakage paths into cartridge slot 36 that there is only a single opening 43 between the interior of the slot 36 and the outside environment; namely, through or around electrical connector socket 40. In other words, the cartridge slot 36 is a "blind" slot (i.e. it does not pass through the housing member 20). Except for a leakage path present by the connection between socket 40 and the connector 300, the housing cartridge slot 36 is a sealed cavity.

An annular upstanding interior and circumferentially extending wall or open sleeve 44 extends unitarily upwardly and outwardly from the exterior surface of the wall 41 of the housing member 20 and is adapted to receive and retain the distal end of the tubular shaft 46 and thus a rotational bearing is provided between the housing member 20 and the tubular shaft 46.

The shaft 46 is in the form of an elongate open tube that includes a solid base 47 having a magnet 60 molded into the plastic material of the base 47 and a cylindrical wall 49 that extends and protrudes upwardly and outwardly from the top of the base 47 and defines an open tubular interior or sleeve 51. The diameter of the base 47 of the shaft 46 is greater than the diameter of the sleeve 51 and defines a shoulder 47a between the base 47 and the sleeve 51.

As shown in FIG. 3, the shaft 46 is located in the sensor assembly 18 in a relationship wherein the base 47 thereof is located and extends into the interior open slot or recess 44a that is defined by the open wall or post or sleeve 44 of the housing member 20 and is seated and abutted against the exterior surface of the top wall 41 of the housing member 20. Thus, in the embodiment shown, the shaft 46 extends in a relationship and orientation generally normal to the housing member 20 and the connector housing 26 and is rotatable relative to the housing member 20.

Shaft 46 is an annular bobbin or mandrel shaped member which provides for mounting and rotary movement of the magnet 60. As will be explained in more detail in the following description, rotary motion of shaft 46 relative to the cartridge assembly 36, and more specifically relative to the hall effect sensor 188 thereon, causes a change in the magnetic field lines sensed by the hall effect sensor 188 which generates an angle signal (i.e., a signal proportional to angle).

The housing member 22, when assembled to the housing member 20, defines both a sleeve for the shaft 46 that retains and guides the rotary movement of the shaft 46 relative to the housing member 20 and also a stop that prevents the axial movement of the shaft 46 in the sensor assembly 18 via the engagement of the housing member 22 with the shoulder 47a on the shaft 46.

The housing member 22 includes an outer wall 51 that includes a lower interior shoulder 57. A generally cylindrically shaped interior open sleeve or wall 59 extends unitarily upwardly and outwardly from the top of the base wall 51. The wall or sleeve 59 in turn includes an interior flange 59a that protrudes outwardly from, and in a relationship spaced from and parallel to, the interior surface of the wall 51.

Housing member 22, and more specifically the exterior surface of the wall 51 thereof, forms a fastener boss or bracket 50 that defines an interiorly threaded fastener aperture 52 which, when in the assembled condition with housing member 20, is in alignment with the fastener bracket 28 and the fastener aperture 30 respectively of the housing member 20. In a preferred embodiment of the present invention, housing member 22 is positioned over and joined and coupled to the housing member 20 in an initial rotational index position in which the respective fastener brackets 28 and 50 are not aligned. Then, the housing members 20 and 22 are indexed rotationally into a position where the respective fastener apertures 30 and 52 defined in the respective fastener brackets 28 and 50 are aligned and a screw or fastener 65 is screwed into the respective fastener apertures 30 and 52 to lock the housing members 20 and 22 together. This is accomplished by an undercut groove (not shown) that is formed in the wall 21 of the housing member 20 and a radially extending tang 56 that is formed at the lower distal end of the sleeve 59 of the in the wall 21 of the housing member 20.

Housing member or sleeve 22 is seated on and abutted against and joined to the housing member 20 in a relationship wherein: the wall 51 thereof, and more specifically the shoulder 57 on the wall 51, is seated and abutted against the top of the wall 41 of the housing member 20; the interior surface of the sleeve 59 of the housing member 22 surrounds and is abutted against the exterior surface of the interior sleeve 44 of the housing member 20; the flange 59a of the housing member 22 surrounds, is abutted against and provides a guide for the shaft 46 (I.e., the shaft 46 extends through the sleeve 59 of the housing member 22); and the distal end of the interior flange 59a of the sleeve 59 of the housing member 22 is seated and abutted against the top surface of the shoulder 48 on the base 47 of the shaft 46 to trap the base 47 of the shaft 46 between the respective housing members 20 and 22 and thus prevent the axial movement of the shaft 46 in the sensor assembly 18 relative to the housing members 20 and 22.

Thus, in the embodiment shown, the housing members 20 and 22 are stationary members; the housing member 20 defines a sleeve 44 adapted to receive the end or base 47 of the rotatable shaft 46; and the housing member 22 defines an elongate retention and guide sleeve 59 for the rotatable shaft 46.

To provide some degree of contamination sealing, a ring-shaped lip seal 62 is seated on a top surface or ledge of the interior flange 59a of the sleeve 59 of the housing member 22 and is wedged between the interior surface of the sleeve 59 of the housing member 22 and the exterior surface of the sleeve 49 of the shaft 46.

An O-ring 58 is installed in the sensor assembly 18 between the housing members 20 and 22 and, more specifically, in a space or gap defined between an interior surface of the wall 51 of the housing member 22 and the exterior surface of the sleeve 44 of the housing member 20.

O-ring 58 and lip seal 62 are provided for contamination sealing for the rotary bearing provided between the wall 44 and the shaft 46; they do not take part in sealing for the sensitive electronic components of sensor cartridge assembly 38 that are protected from contamination in the cartridge slot 36 defined in housing member 20.

The rotatable arm member 24 is positioned over the shaft 46 and the housing member 22 and includes an annular sidewall 64 which encloses a torsion spring 66.

The annular ring-shaped and circumferentially extending side wall 64 together with a top wall 69 define a cap 71 that is located and surrounds the sleeve 59 of the housing member 22 in a relationship wherein: the side wall 64 of the cap 71 is spaced from and surrounds the sleeve 59 of the housing member 22; the interior surface of the top wall 69 of the cap 71 is located opposite and spaced from the distal end of the sleeve 59 of the housing member 22; the helical spring 66 surrounds the sleeve 59 of the housing member 22 and is located between the sleeve 59 of the housing member 22 and the wan 64 of the cap 71 of the arm member 24; and the shaft 46 extends through a central through-hole or aperture 91 defined in the center of the top wall 69 of the cap 71.

An elongate arm 24a extends outwardly from the exterior surface of the side wall or collar 64 of the cap 71.

Torsion helical spring 66 may be employed in certain applications of the sensor assembly 18 to rotationally bias the arm member 24 toward one end of its extreme range of rotary motion. This may be desirable for preloading the linkage 14 and also for providing a failure indication should linkage 14 or another component fail. By causing arm member 24 and arm 24a to rotate to an extreme position, the resulting signal (or lack of signal) can be interpreted as a failure indication for the sensor. Torsion spring 66 includes a pair of upstanding ends (not shown) for coupling the torsion spring 66 to both the arm member 24 and one of the housing members 20 or 22, for providing the rotational biasing mentioned above.

For example, in the embodiment of the sensor assembly 18 shown in FIG. 3, the arm member 24 defines a plurality of apertures (not shown) defined in respective bosses 68 that are defined in the interior surface of the top wall 69 of the cap 71 of the arm member 24 and are adapted to receive the one of the ends (not shown) of torsion spring 66. A plurality of such spaced-apart apertures are provided in the cap 71 so that the preload and indexed desired position of the rotary arm member 24 may be achieved, i.e., the one of the ends of the torsion spring 66 is inserted into whichever one of the apertures will provide the requisite preselected preload and index position of the arm member 24. A roll pin 70 is installed through respective additional bores (not shown) defined in the wall 69 of the cap 71 and the sleeve 49 of the shaft 46, respectively for assembling and coupling these components together and, more specifically, for coupling the shaft 46 and the arm member 24 for rotation together.

Significant structural loads are placed on the rotary arm member 24 exerted at a distal ball end 74 of the arm 24a, opposed to the end of the arm member 24 unitary with the cap 71, particularly applied by dynamic motion. In one embodiment, ball end 74 may be formed of metal and is insert-molded into the distal end of the arm 24a. In another approach, ball end 74 may be formed integrally with the distal end of the arm 24a. For the latter configuration, the strength of ball end 74 can be increased by forming a blind bore 76 into the ball end as shown in FIG. 2, and thereafter inserting a metal pin (or a roll pin) 78 into the bore 76.

FIGS. 4A, 4B, and 4C illustrate two different sensor cartridge and element arrangements 138 (FIGS. 4A and 4B) and 238 (FIG. 4C). It is advantageous that the magnetic field sensor elements used as part of sensor cartridge assembly 138 are capable of measuring the magnetic field exerted by magnet 60 along two orthogonal axes. This is desirable since this enables the sensor to not only measure the magnitude of the field passing through the electrical sensor element, but also the direction of the magnetic field vector. This is advantageous since the strength of the magnetic field exerted by magnet 50 can be affected by the properties of the magnet itself which change over time, as well as the characteristics of the material separating the magnet from the electrical sensor elements, and the calibration and electrical characteristics of the sensor element. By examining components of the magnetic field vector in two axes, these effects can be practically eliminated.

The embodiment of cartridge assembly 138 shown in FIGS. 4A and 4B uses a two axis magnetic sensitive element in the form of a Hall effect sensor element 188 (which may be an integrated package of two or more elements) which is mounted to a PC (printed circuit) board 190 and assembled to a terminal header 182.

The terminal header 182 includes a generally rectangularly shaped flat base plate 183 and a flat end cover plate or head or wall 184 extending in a relationship generally normal to the base plate 183.

The base plate 183 defines a longitudinal axis and includes a pair of opposed side walls or surfaces 185a and 185b extending on opposite sides of, and parallel to, the longitudinal axis of the base plate 183 and a pair of end walls or surfaces 185c and 185d extending in a direction normal to the longitudinal axis of the base plate 183. The cover end plate or head 184 extends along the edge of the end wall 185d in a relationship normal to and intersecting the longitudinal axis of the base plate 183.

The base plate 183 also defines a plurality of openings or through-holes 189a extending between the opposed top and bottom surfaces 190a and 190b thereof and at least a first recess 189b defined in the bottom surface 190b of the base plate 183.

The base plate 183 additionally includes a plurality of posts or fingers 191 protruding generally normally and unitarily upwardly and outwardly from the surface 190b.

The base plate 183 still further includes a pair of diametrically opposed upstanding posts 192a and 192b protruding generally normally and unitarily outwardly from the respective edges of the opposed side walls 185a and 185b of the base plate 183 and are located adjacent and spaced from the end wall 185c.

A plurality of metal electrical terminals 186 (three such spaced apart terminals 186 being shown in the embodiment of FIGS. 4A and 4B) are molded into the plastic material of the terminal header 182 in a relationship wherein the respective first ends 186a of the respective terminals 186 protrude generally normally outwardly from the exterior surface of the end plate 184 and extend in the same direction as the longitudinal axis of the base plate 183 and the respective opposed ends 186b of the respective terminals 186 protrude generally normally outwardly from the surface 190b of the base plate 183 of the terminal header 182 in a relationship and direction normal to the direction and relationship of the longitudinal axis of the terminal header 182.

The printed circuit board 190 shown in FIG. 4A is in the form of a flat plate that includes opposed top and bottom surfaces 194a and 194b; opposed longitudinal side walls or surfaces 195a and 195b, and opposed end walls or surfaces 195c and 195d. The board 190 defines respective first and second pluralities of through apertures or holes 196a and 196b extending between the top and bottom surfaces 194a and 194b. The hall effect sensor element 188 and a plurality of other electronic components 197 are seated and mounted to the surface 194a of the board 190. Two diametrically opposed corners of the board 190 define respective cut-outs 198.

Figure 5:
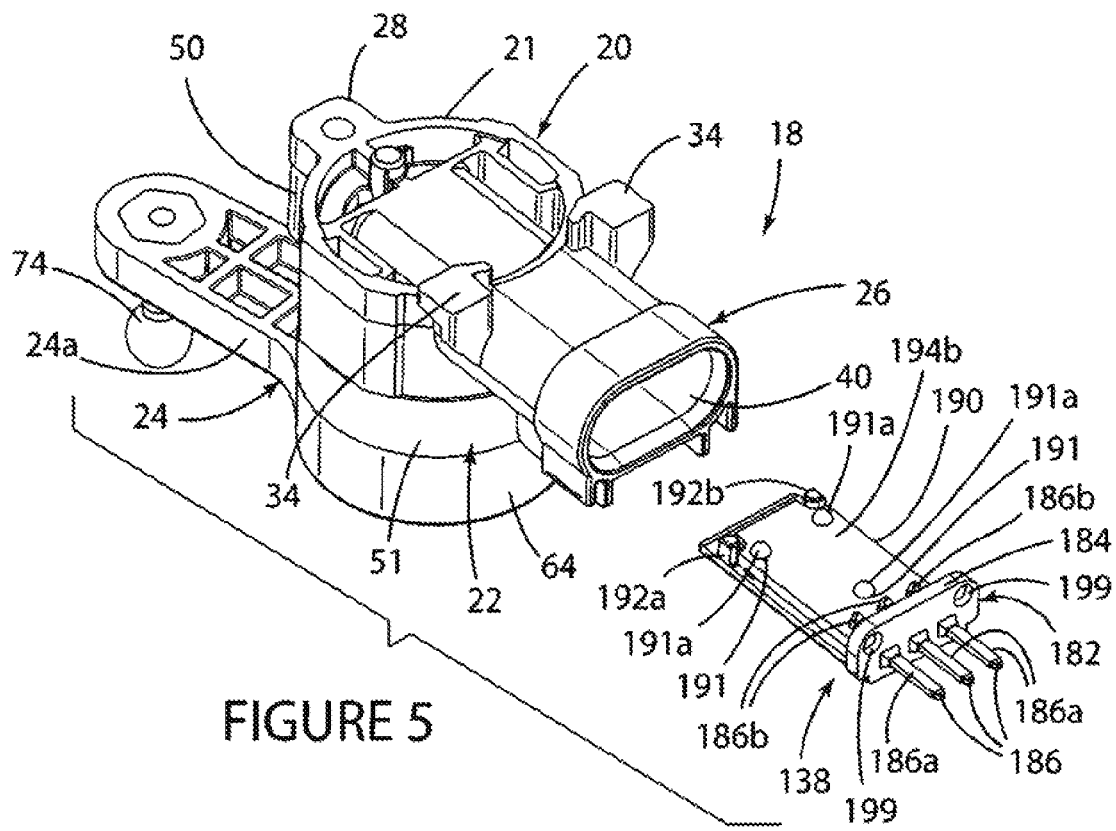
FIG. 5 is a perspective view of the vehicle chassis sensor assembly with the sensor cartridge exploded therefrom.
Figure 6:
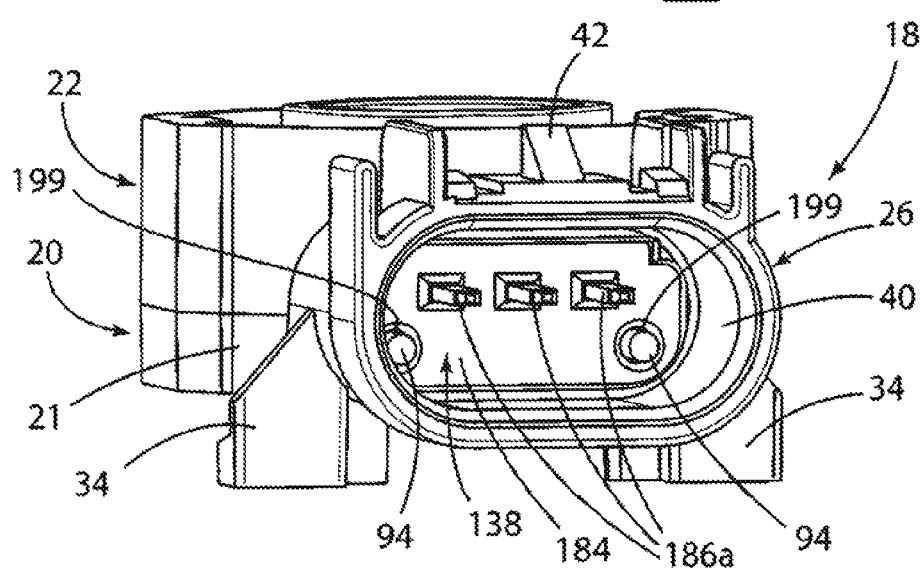
FIG. 6 is a perspective view of the connector housing socket of the vehicle chassis sensor assembly of the present invention.

The board 190 is mounted and secured to the terminal header 182, and more specifically is mounted and secured to the base plate 183 of the terminal header 182, in a relationship as shown in FIGS. 3 and 5 wherein: the surface 194a of the board 190 is positioned opposite and parallel to the surface 190b of the base plate 183 of the terminal header 182; the end wall 195b of the board 190 is located opposite the interior surface of the head plate 184 of the terminal header 182; the respective posts 192a and 192b on the terminal header 182 are wedged in the respective cut-outs 198 in the board 190; the respective fingers 191 extend through the respective apertures 196b in the board 190; the respective ends 186b of the respective terminals 186 extend through the respective apertures 196a in the board 190; the sensor element 188 extends into the through-hole 189a defined in the base 183 of the terminal header 182; and the electronic elements 197 extend into the recess 189b defined in the base 183 of the terminal header 182.

Although not shown in any of the FIGURES, it is understood that a plurality of electrical leads or wires or traces on and in the board 190 interconnect the plurality of elements 188 and 197 to each other and to the ends 186b of the terminals 186

To secure the board 190 to the terminal head 182, the tips of the stake fingers 191 are deformed or bent, as for example by ultrasonic welding or heating, to cause them to thermally deform and bend into dome or mushroom shaped heads 191a (FIGS. 3 and 5) for holding, staking, and securing the board 190 to the terminal head 186.

FIG. 4C shows another cartridge assembly 238 that includes a magnetic sensitive element in the form of a magneto resistive (MR) sensor element 280 assembled to a terminal header 282, and enclosed by a cover 28. The MR element 280 includes a plurality of electrical terminals 280a which are electrically connected to the respective ends (not shown but similar to the ends 186b of the terminals 186 of the cartridge assembly 138) of the respective terminals 286 that are molded into the plastic material of the terminal header 282.

The terminal header 282 includes a generally rectangularly shaped flat base plate 283 and a flat end cover plate or head 284 unitary with, and extending in a relationship generally normal to, the base plate 283.

The base plate 283 defines a longitudinal axis and includes a pair of opposed side walls or surfaces 285a and 285b extending on opposite sides of and parallel to, the longitudinal axis of the base plate 283 and a pair of end walls or surfaces 285c and 285d extending in a direction normal to the longitudinal axis of the base plate 283. The end cover plate or head 284 protrudes upwardly from the edge of the end wall 285d in a relationship normal to and intersecting the longitudinal axis of the base plate 283.

The base plate 283 defines an interior recess or cradle 289 that is adapted to receive and seat the MR element 280.

A plurality of metal electrical terminals 286 (three such spaced apart terminals 186 being shown in the embodiment of FIG. 4C) are molded into the plastic material of the terminal header 282 in a relationship wherein the respective first ends 286a of the respective terminals 286 protrude generally normally outwardly from the exterior surface of the end plate 284 and extend in the same direction as the longitudinal axis of the base plate 283 and the respective opposed ends (not shown) of the respective terminals 286 protrude generally normally outwardly into the recess or cradle 289 of the base plate 283 and are electrically coupled to the ends of electrical terminals 280a of the MR element 280 when the MR element 280 is seated in the recess or cradle 289.

The cover 281 is lowered and coupled to the base plate 283 of the terminal header 282 in a relationship overlying and covering the recess or cradle 289 and sealing the MR element 280 against contamination.

FIGS. 3 and 5 depict and illustrate the insertion and placement of the cartridge assembly 138 into the housing member 20 of the sensor assembly 18 and more specifically into the cartridge slot or cavity 36 that is defined in the interior of the housing member 20.

Initially, and as shown in FIG. 5, the cartridge assembly 138 is inserted into the interior of the housing member 20 through the connector housing 26 and more specifically through the interior of the connector socket 40, then through the opening 43 in the housing member 20, and then into the cartridge slot or recess 36 into the relationship as shown in FIG. 3 wherein: the end wall and a portion of the flat plate 183 of the terminal header 182 is inserted into another slot 36a and is seated and supported on a ledge 37 that is defined by the wall 21 of the housing member 20; the surface 190a of the base plate 183 of the terminal header 182 is abutted against the interior surface of the wall 41 of the housing member 20; the hall effect sensor element 188 is located directly opposite and spaced from and parallel to the magnet 60 molded into the base 47 of the shaft 46; the end plate or head 184 of the terminal header 182 covers and closes the opening 43 and the lower distal edge of the end wail or head 184 of the terminal header 182 is abutted against a shoulder 39a defined on the interior surface of the wail 39 of the housing member 20; and a pair of stake posts or fingers 94 (FIGS. 3 and 5) defined in the interior of the housing member 20 extend through respective through openings or holes 199 defined and extending between the interior and exterior surfaces of the head plate 184 of the terminal header 182. The sensor cartridge assembly 238 also includes similar openings or holes 299 defined in the head plate 284.

After assembly of sensor cartridge assembly 138 into position within housing member 20 as described above, the distal ends of the posts 94 may be thermally deformed or bent in the same manner as the posts or fingers 191, as by for example an ultrasonic welding or heating process, for staking, holding, retaining, and securing the cartridge assembly 138 into its installed position in the housing member 20.

FIG. 3 illustrates that the only potential leakage or contamination path present after attachment of electrical connector 300 is through or around the connector socket 40 and, more specifically, through and around the peripheral edges of the terminal end plate 184 of the cartridge assembly 138 that covers the opening 43 defined between the interior cartridge slot 36 and the interior connector socket 40. A separate leakage path present in prior art designs needed for enclosing the electrical elements of the sensor is eliminated in this design.

The terminal end plate 184 of the cartridge assembly 138 seals the opening 43 against leakage or exterior contaminants by virtue of the interference fit between the material of the housing member 20 surrounding the opening 43 and the peripheral circumferential edge of the plate 184 and further as a result of the terminal end plate 184 being held tight against the wall 39 and shoulder 39a of the housing member 20 via the heat staking of the cartridge assembly 138 in the housing member 20.

Further, and as shown in FIG. 3, a suitable sealing member 302 may be used to improve the sealing of the opening 43 against leakage and exterior contaminants. In the embodiment shown, the sealing member 302 in the form of a gasket or ring made of a suitable sealing material, such as for example, an elastomeric or rubber material, that has been inserted into position between the opening 43 and the terminal end cover plate 184 of the cartridge assembly 138 for providing an improved seal between the plate 184 and the housing member 20 and for sealing the cartridge slot 36 from leakage or exterior contaminants.

In the embodiment shown, the sealing member 302 is positioned in an abutting relationship with and between the material of the housing member 20 surrounding the opening 43 and the surface of the circumferential groove or slot 184a defined in the peripheral circumferential edge of the interior surface of the terminal end cover plate 184 and adapted to hold and fit the sealing member 302 for providing an improved seal of the opening 43, and thus the interior of the cartridge slot 36, from leakage and exterior contaminants.

In the embodiment as shown in FIG. 3, the sensor assembly 18 defines a longitudinal axis L and the shaft 46 and sleeve 49 thereof, the wall 21 of the housing member 20, the wall 64 of the cap 71 of the arm member 24, the wall 59 of the housing member 20, and the brackets 28 and 50 on the housing members 20 and 22 respectively all extend in the same direction as parallel to, and spaced from, the longitudinal axis L of the sensor assembly 18.

Also, in the embodiment as shown in FIG. 3, the housing member 20 and more specifically the walls 39 and 41 and the cartridge slot 36 thereof, the base 47 of the shaft 46, the magnet 60 in the base 47 of the shaft 46, the cartridge assembly 138 including the terminal header 182, the board 190, and the hall sensor 188 all extend in a direction normal to and intersect the longitudinal axis L of the sensor assembly 18.

The arm 24a of the arm member 24 extends in a direction normal to the direction of the longitudinal axis L of the sensor assembly 18.

While the above description constitutes the preferred embodiment of the present invention, it will be appreciated that the invention is susceptible to modification, variation and change without departing from the proper scope and fair meaning of the accompanying claims.

We claim:

1. A sensor assembly for measuring rotary motion comprising:
    a first housing forming a blind cartridge slot terminating at an opening located between the blind cartridge slot and an electrical connector socket unitary with the first housing, the first housing further including a wall having mounting provisions for affixing the sensor assembly to supporting structure;
    a second housing affixed to the first housing,
    a shaft positioned to rotate relative to the first and second housings and being axially trapped in position between the first and second housings, the shaft retaining a permanent magnet;
    an arm coupled to and rotatable with the shaft and
    a sensor cartridge assembly having a magnetic sensitive element carried by a terminal header inserted into the blind cartridge slot in the first housing through the connector socket and through the opening between the connector socket and the blind cartridge slot, the terminal header including a wall that covers the opening between the blind cartridge slot and the connector socket.

2. The sensor assembly of claim 1 wherein the arm is adapted for connection to the chassis of a vehicle for measuring the ride height of a vehicle.

3. The sensor assembly of claim 1 wherein the magnetic sensitive element is a Hall effect element or a magneto resistive element.

4. The sensor assembly of claim 1 wherein the first housing includes at least a first post that extends through at least a first aperture defined in the sensor cartridge assembly and is staked to the sensor cartridge assembly for securing the sensor cartridge assembly in the blind cartridge slot in the first housing.

5. The sensor assembly of claim 1 wherein the sensor cartridge assembly includes a terminal header having a first plate with at least a first post and a board having the magnetic sensitive element and defining at least a first aperture, the first post on the terminal header extending through the first aperture in the board for securing the board to the first plate of the terminal header, 6. The sensor assembly of claim 1 wherein the sensor cartridge assembly includes a terminal header with a plate defining a cradle for the magnetic sensitive element, and a cover overlying the plate and the magnetic sensitive element.

7. A vehicle chassis sensor assembly comprising:
    a first housing member defining a sensor cartridge slot;
    a connector housing coupled to the first housing member and defining a connector socket, the sensor cartridge slot and the connector socket being in communication via an opening between the sensor cartridge slot and the connector socket;
    a shaft rotatable relative to the first housing member and including a magnet for generating a magnetic field;
    a sleeve that guides the rotary movement of the shaft and prevents the axial movement of the shaft;
    a rotatable arm member, the shaft being coupled to the arm member and rotatable in response to the rotation of the arm member; and
    a sensor cartridge including a sensor and mounted in the first housing member through the connector socket and the opening between the sensor cartridge slot and the connector socket, the sensor being adapted to sense a change in the mantic field generated by the magnet in response to the rotation of the shaft.

8. The vehicle chassis sensor assembly of claim 7 wherein the sensor cartridge includes a plate that covers the opening between the sensor cartridge slot and the connector socket.

9. The vehicle chassis sensor assembly of claim 7 wherein the first housing member includes at least a first post extending through at least a first aperture defined in the sensor cartridge for securing the sensor cartridge in the first housing member.

10. The vehicle chassis sensor assembly of claim 7 wherein the sensor cartridge includes a terminal header and a board coupled to the terminal header, the sensor being mounted on the board.

11. The vehicle chassis sensor assembly of claim 10 wherein the terminal header includes a plurality of posts extending through respective apertures defined in the board for securing the board to the terminal header.

* * * * *